US005607037A

United States Patent [19]
Yarnell et al.

[11] Patent Number: 5,607,037
[45] Date of Patent: Mar. 4, 1997

[54] SPRINGS FOR VEHICLE TRANSMISSION SYNCHRONIZER

[75] Inventors: James A. Yarnell, Temperance, Mich.; William R. Lefevre, Perrysburg; Brian L. Rang, Swanton, both of Ohio

[73] Assignee: Dana Corporation, Toledo, Ohio

[21] Appl. No.: 565,254

[22] Filed: Nov. 30, 1995

[51] Int. Cl.⁶ ..................................................... F16D 23/06
[52] U.S. Cl. .................. 192/53.331; 192/48.91; 74/339
[58] Field of Search ............................ 192/53.33, 53.331, 192/53.332, 48.91; 74/339

[56] References Cited

U.S. PATENT DOCUMENTS

| | | | |
|---|---|---|---|
| 2,573,613 | 10/1951 | Schutze | 192/53.331 |
| 3,221,851 | 12/1965 | Vandervoort | 192/53.331 |
| 3,419,120 | 12/1968 | Stott | 192/53.331 |
| 3,692,163 | 9/1972 | Ruettinger | 192/53.331 |
| 3,695,403 | 10/1972 | Eastwood | 192/53.331 |
| 3,739,890 | 6/1973 | Nolli | 192/53.331 |
| 4,162,001 | 7/1979 | Yant | 192/53.331 |
| 4,796,741 | 1/1989 | Loeffler | 192/53.331 |
| 5,111,922 | 5/1992 | Reynolds | 192/53.331 |

OTHER PUBLICATIONS

Rockwell Auxiliary Gear Synchronizer Assemble (2 pages)—undated.
Dana Drawing No. 313627X dated Jul. 10, 1987.

Primary Examiner—Richard M. Lorence
Attorney, Agent, or Firm—MacMillan, Sobanski & Todd

[57] ABSTRACT

A transmission gear synchronizer apparatus includes first and second friction races mounted for movement coaxially with each other in a spaced apart relationship, with the friction races being mounted for coaxial movement into and out of engagement with friction surfaces. An annular shiftable clutch collar is positioned between the two friction races, with the clutch collar being mounted for coaxial movement with respect to the friction races to enable engagement of the clutch collar with transmission gears, the clutch collar having at least one orifice through which a pin can be extended. A first pin extends through the clutch collar orifice, and is secured at one end to the first friction race, with the other, distal end of the first pin extending toward the second friction race, where alignment of the first pin within the clutch collar orifice is required to enable the clutch collar to move axially with respect to the friction races. A spring biases the first pin out of alignment with the clutch collar orifice so that alignment of the first pin within the clutch collar orifice requires force to overcome the bias of the spring, where one end of the spring is connected to the distal end of the pin and the other end of the spring is connected to the second friction race.

20 Claims, 4 Drawing Sheets

SPRINGS FOR VEHICLE TRANSMISSION SYNCHRONIZER

BACKGROUND OF THE INVENTION

This invention relates in general to vehicle transmissions and in particular to an improved system for synchronizing the speeds of various rotating members to enable smooth gear shifts in a vehicle transmission.

In most vehicles, a transmission is provided in the drive train between the engine and the driven wheels. As is well known, the transmission includes a housing containing an input shaft, an output shaft, and a plurality of meshing gears which are selectively connected between the input shaft and the output shaft. The meshing gears contained within the transmission housing are of varying size so as to provide a plurality of speed reduction gear ratios between the input shaft and the output shaft. By appropriate selection of these meshing gears, a desired speed reduction gear ratio can be obtained between the input shaft and the output shaft. As a result, acceleration and deceleration of the vehicle can be accomplished in a smooth and efficient manner.

Typically, the gear ratio selection is accomplished by moving one or more control members provided within the transmission. Movement of the control member causes certain ones of the meshing gears, referred to as "ratio gears", to be connected between the input shaft and the output shaft so as to provide the desired gear ratio between the input shaft and the output shaft. In a manual transmission, movement of the control member is accomplished through manual exertion by the vehicle driver, typically using a shift lever. In an automatic transmission, movement of the control member is accomplished by a pneumatic, hydraulic or electrical actuator in response to predetermined operating conditions.

In typical vehicle transmissions, the mechanism to engage various gears is the axial movement of splined, rotatable members into engagement with each other. A control member, such as a splined clutch collar, is moved axially from a neutral position to a position in which the clutch collar splines engage the splines of a rotatable ratio gear. The ratio gear may be linked indirectly to the transmission input shaft. The splines of the clutch collar also engage the splines of a rotatable drive gear, such as a hub, which is linked to or directly mounted on a drive shaft, such as a mainshaft. Thus, the clutch collar is rotatably mounted and is moveable axially to simultaneously engage the splines of the ratio gear and the hub, thereby connecting the mainshaft to a specific driven ratio gear.

In order to accomplish the engagement of the various gears in a smooth manner, the rotating members, such as the clutch collar and the ratio gear which are to be interconnected, must be rotating at approximately the same rate. Otherwise, the splines of the one rotating member will not be able to intermesh with the splines of the other without interfering with each other or crashing. Various ways are known for synchronizing the speeds of various rotating members. A commonly used synchronizer apparatus employs a series of frustoconically shaped rotatable members which nest with generally parallel contact surfaces. At least one of the frustoconical surfaces is connected directly or indirectly to one of the rotating splined members, and another of the frustoconical surfaces is connected to the other of the rotating splined members. An initial movement of the splined members toward each other causes the frustoconical surfaces, rotating at different speeds, to be pressed together. The frictional force between the frustoconical surfaces causes an equalization of speeds, thereby enabling the complete engagement of the rotating splined members without crashing.

SUMMARY OF THE INVENTION

An improved synchronizer apparatus has now been developed. The improved synchronizer apparatus provides for controlling the axial movement of a shiftable clutch collar with respect to the two friction races by providing a spring to establish a biasing force which must be overcome prior to shifting the clutch collar. By establishing the biasing force, initial movement of the clutch collar will be delayed until the friction races can engage their associated friction surfaces to synchronize the gears.

The transmission gear synchronizer apparatus of the invention includes first and second friction races mounted for movement coaxially with each other in a spaced apart relationship. The friction races are mounted for coaxial movement into and out of engagement with friction surfaces. An annular shiftable clutch collar is positioned between the two friction races, with the clutch collar being mounted for coaxial movement with respect to the friction races to enable engagement of the clutch collar with transmission gears. At least one pin extends through a clutch collar orifice, and is secured at one end to the first friction race, with the other, distal end of the pin extending toward the second friction race. Alignment of the pin within the clutch collar orifice is required to enable the clutch collar to move axially with respect to the friction races. A spring biases the pin out of alignment with the clutch collar orifice so that alignment of the pin within the clutch collar orifice requires force to overcome the bias of the spring.

In a specific embodiment of the invention, one end of the spring is connected to the distal end of the pin and the other end of the spring is connected to the second friction race. Preferably, the spring is normally under tension, and the distal end of the pin extends through an orifice in the second friction race. The orifice in the second friction race is larger than the pin to enable the pin to move circumferentially with respect to the second friction race. Preferably, the connection of the spring to the second friction race is through an opening in the second friction race. The distal end of the pin has an annular groove for securing the spring, and the spring has a curved end which is wrapped around the distal end of the pin.

Preferably, the apparatus includes a set of first pins secured to the first friction race and extending through the clutch collar to the second friction race, and a set of second pins secured to the second race and extending through the clutch collar, where alignment of the second pins within the clutch collar orifices is required to enable the clutch collar to move axially with respect to the friction races, and where alignment of the second pins within the clutch collar orifice requires circumferential movement of the clutch collar with respect to the second friction race, thereby requiring force to overcome the bias of the spring.

In another embodiment of the invention, the spring is adapted to bias the first set of pins with respect to the second set of pins so that alignment of the first pins within the clutch collar orifices requires force to overcome the bias of the springs, where one end of the springs is connected to the distal end of one of the first pins and the other end of the springs is connected to one of the second pins. Preferably, the spring connected to both the first pin and a second pin is a beam spring.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
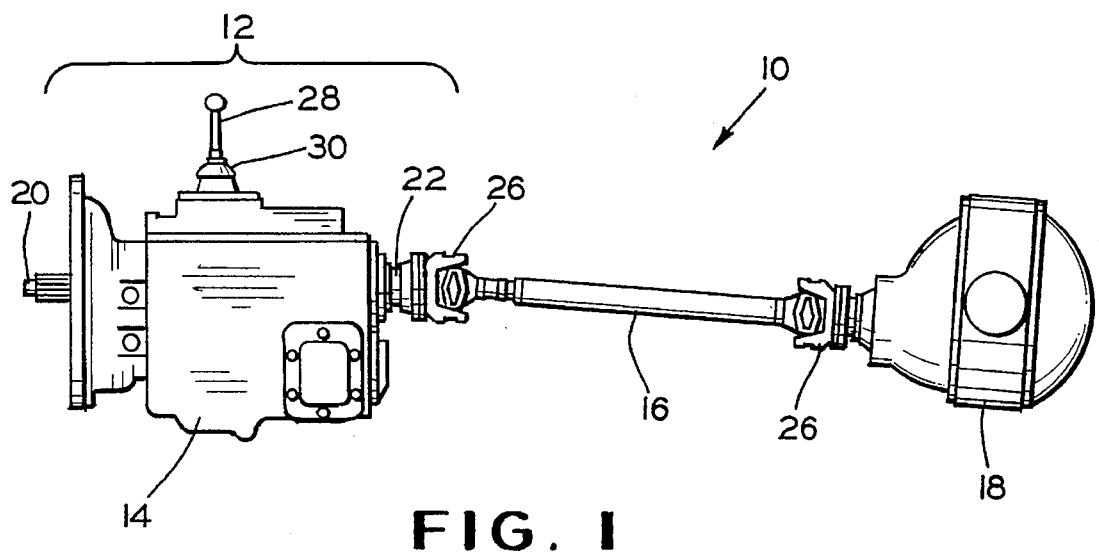
FIG. 1 is a side elevational view schematically illustrating a portion of a conventional vehicular drive train system including the vehicle transmission which houses the synchronizer of the invention.

Referring now to the drawings, there is illustrated in FIG. 1 a schematic view of a portion of a vehicular drive train system, indicated generally at 10. A major portion of the drive train system 10 is the transmission assembly 12, which includes vehicle transmission 14. The transmission is connected through drive shaft 16 to axle assembly 18. The transmission 14 is generally conventional in the art and is intended to be representative of any known vehicle transmission structure, either manually, pneumatically or automatically shifted. The transmission 14 also includes input shaft 20 connected to the vehicle engine, not shown, and output shaft 22. Universal joints 26 connect the drive shaft 16 to the output shaft 22 and the axle assembly 18, respectively. The transmission is manually operable using gearshift lever 28 mounted through shift tower assembly 30. A pneumatically shifted range can also be provided. The term "transmission assembly" refers to any element of the transmission 14 as well as any associated part in the drive train, such as, for example, the input shaft 20, the output shaft 22, the universal joint yoke 24 and the shift tower assembly 30. Although the drive system shown in FIG. 1 is a main transmission, it is to be understood that the synchronizer of the invention can be used in the range shifting section of a compound transmission. Such a transmission would ordinarily be pneumatically shifted.

The transmission generally provides for shifting into various gear ratios by axially shifting a clutch collar to link gears driven by the input shaft 20 with the output shaft 22. The transmission includes a plurality of coaxially rotating ratio gears and a coaxially rotating hub. The ratio gears are journally mounted on a drive shaft for rotation. The ratio gears are adapted with gear teeth which mesh with gear teeth on a complimentary gear wheel, not shown. Typically, the ratio gears are linked through the gear wheel to a rotating countershaft, not shown, which is linked to the transmission input shaft receiving torque from the vehicle engine. Thus, the ratio gears receive driving force from the vehicle engine. Several similar ratio gears of different diameters receive torque from the vehicle engine in the same manner. The structure and operation of vehicle transmissions providing torque to ratio gears is conventional and well known in the art.

Figure 4:
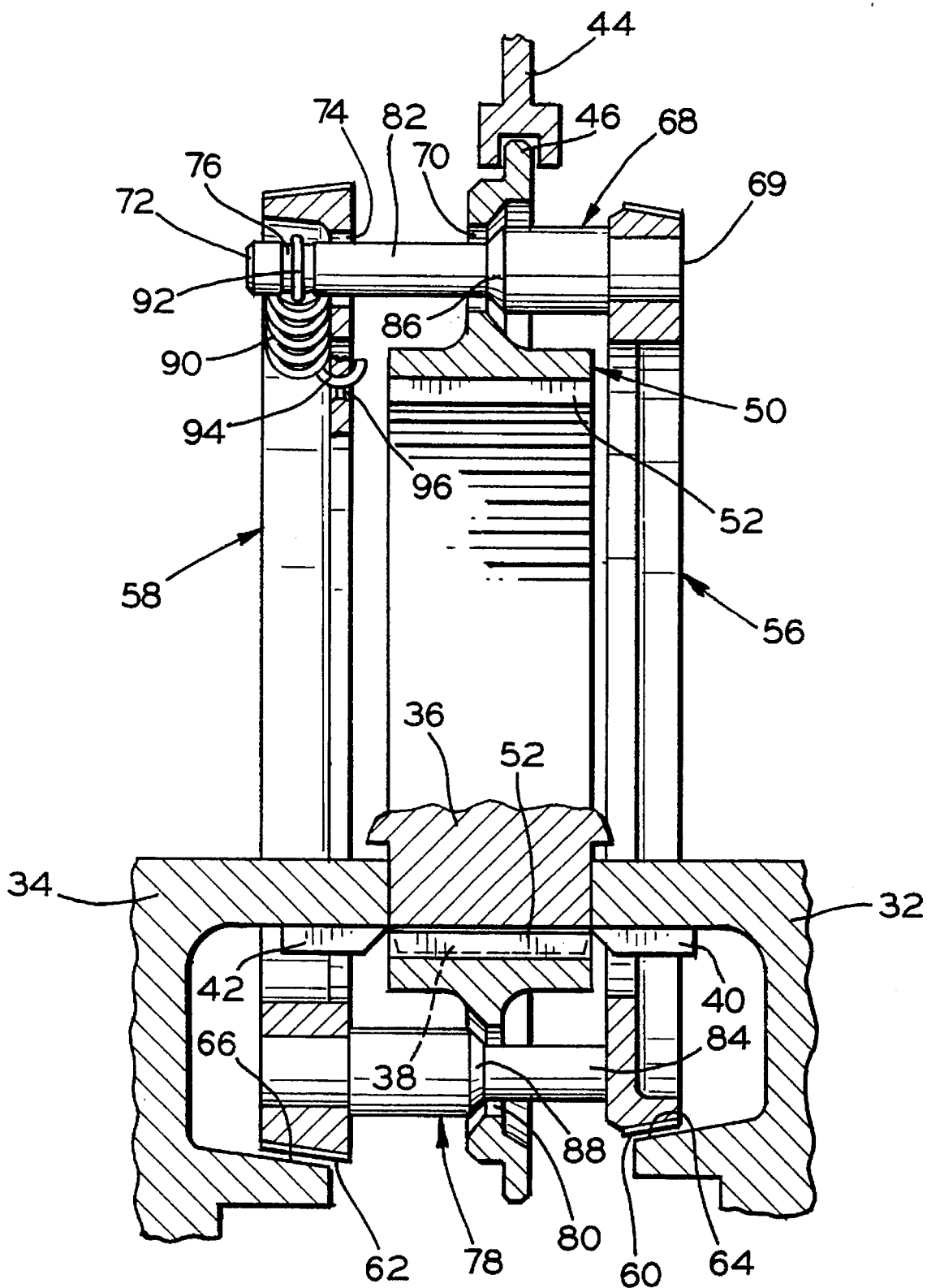
FIG. 4 is a schematic cross-sectional view in elevation of the transmission assembly of the invention, taken along line 4—4 of FIG. 3.

FIG. 4 shows two such ratio gears, 32 and 34, positioned on the forward and rearward sides of the centrally located hub 36, only part of which is shown. Although only two ratio gears are shown, the transmission can include any number of ratio gears. Operation of the transmission involves connection between the central hub and one of the ratio gears. The hub is provided with a plurality of outwardly extending splines 38, and the ratio gears are provided with similarly outwardly extending teeth 40 and 42, respectively.

The gearshift lever 28 is connected to shift fork 44, so that movement of the gearshift lever causes the shift fork to engage the annular flange 46 on the annular clutch collar 50, and to shift the clutch collar forward or rearward. The clutch collar can also be shifted pneumatically with a piston, not shown. The clutch collar is shown as being in a neutral position. The clutch collar 50 is provided with a plurality of internal splines 52 for engagement with the ratio gear teeth. When the clutch collar 50 is moved forwardly (to the left in FIG. 4), the internal splines 52 of the clutch collar will span or connect the hub splines 38 with the ratio gear teeth 40 in a meshing relationship to transmit torque to and from the hub. Likewise, when the clutch collar 50 is moved rearwardly (to the left in FIG. 4), the internal splines 52 of the clutch collar will span or connect the hub splines 38 with the ratio gear teeth 42.

Figure 2:
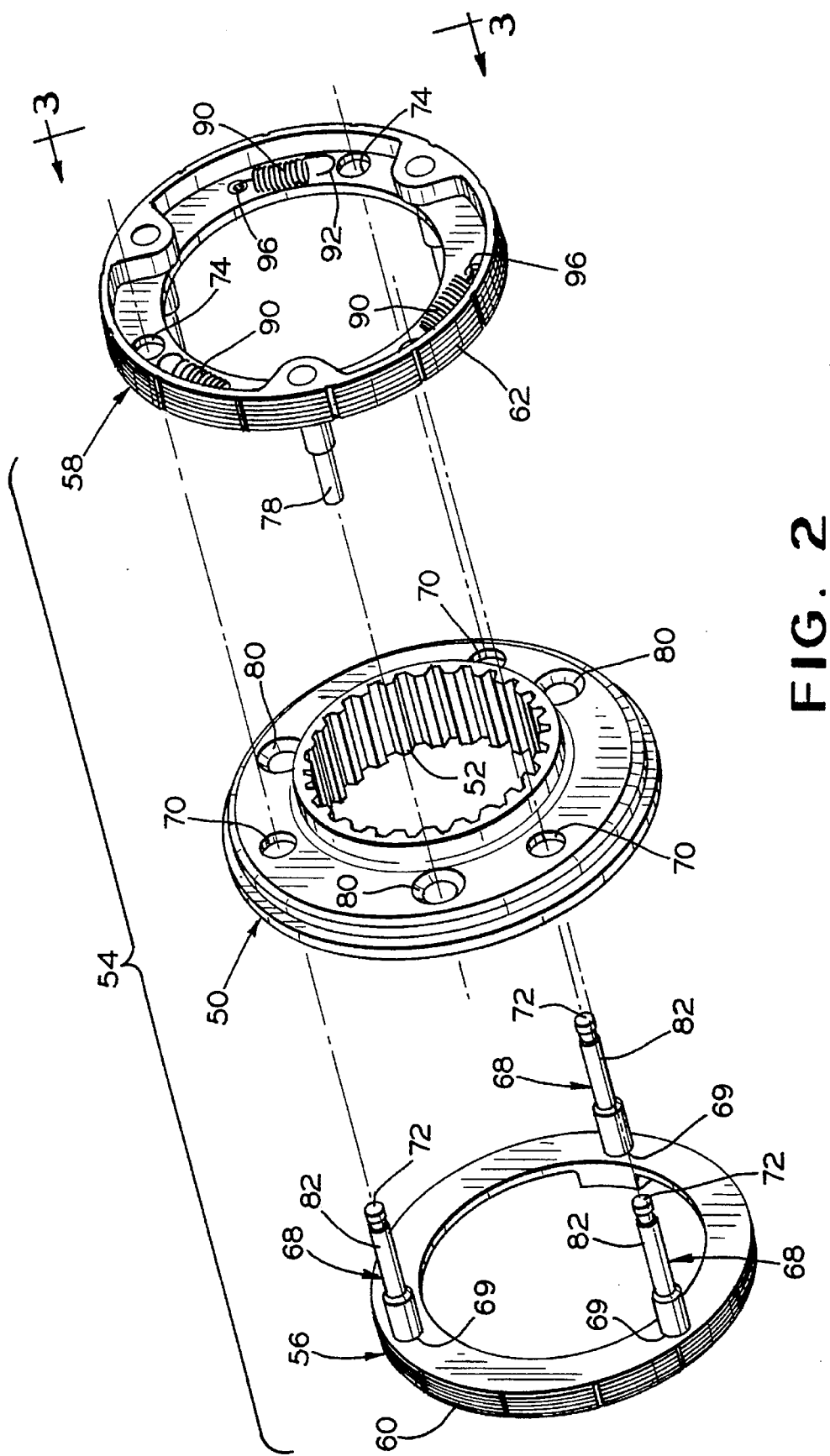
FIG. 2 is an exploded perspective view schematically showing the synchronizer assembly of the invention.

As can be seen from FIGS. 2 and 4, the synchronizer assembly 54 includes three main components, the clutch collar 50, the first friction race 56 and the second friction race 58. The friction races are mounted for coaxial movement to with the clutch collar, and generally move as a unit forwardly and rearwardly. The friction races can be adapted with friction surfaces, such as first friction surface 60 and second friction surface 62, for engagement with friction rings 64 and 66, respectively, on the ratio gears 32 and 34. Forward movement of first friction race 56 causes friction surface 60 to press against friction ring 64, and this pressure will eventually synchronize the rotative speed of the first ratio gear 32 with the speed of the first friction race 56. Rearward movement of second function race 58 causes function surface 62 to press against function ring 66, and this pressure will eventually synchronize the rotative speed of the second ratio gear 34 with the speed of the second friction race 58. The clutch collar is rotatively connected to both friction races so that the rotative speed of the clutch collar will be synchronized with either of the two gears selected.

As shown in FIG. 2, a set of pins, such as first blocker pins 68, are secured at one end 69 to the first friction race 56. These pins pass through a first set of orifices 70 in the clutch collar, and the first blocker pin distal ends 72 extend to the second friction race 58. Preferably the distal ends 72 extend through second friction race orifices 74. The friction race orifices are large enough that the first pins can move within the orifice. Preferably, the first blocker pins are provided with a mechanism, such as annular groove 76, for attaching a spring as shown in FIG. 4. The first blocker pins assure that the clutch collar will rotate in unison with the friction races, and the pins also enable the clutch collar to move axially with respect to the friction races. A second set of blocker pins 78 is mounted in the second friction race 58, and these pins extend through second clutch collar orifices 80 and toward the first friction race 56. The second set of blocker pins acts to maintain a minimum separation between the two races, 56 and 58.

The first pins 68 are provided with a reduced diameter portion 82, and likewise the second pins 78 are provided with a reduced diameter portion 84. The transition point in the pin diameters creates shoulders 86 in the first pins and shoulders 88 in the second pins. It can be seen that for the clutch collar to move axially forward, toward the first friction race, the clutch collar must be oriented so that the first pin is axially aligned within the first clutch collar orifices 70. The shoulders will interfere with relative axial movement if the first pin is not centered within the orifice. The shoulders are chamfered to facilitate movement in the axial direction once alignment is achieved.

Figure 3:
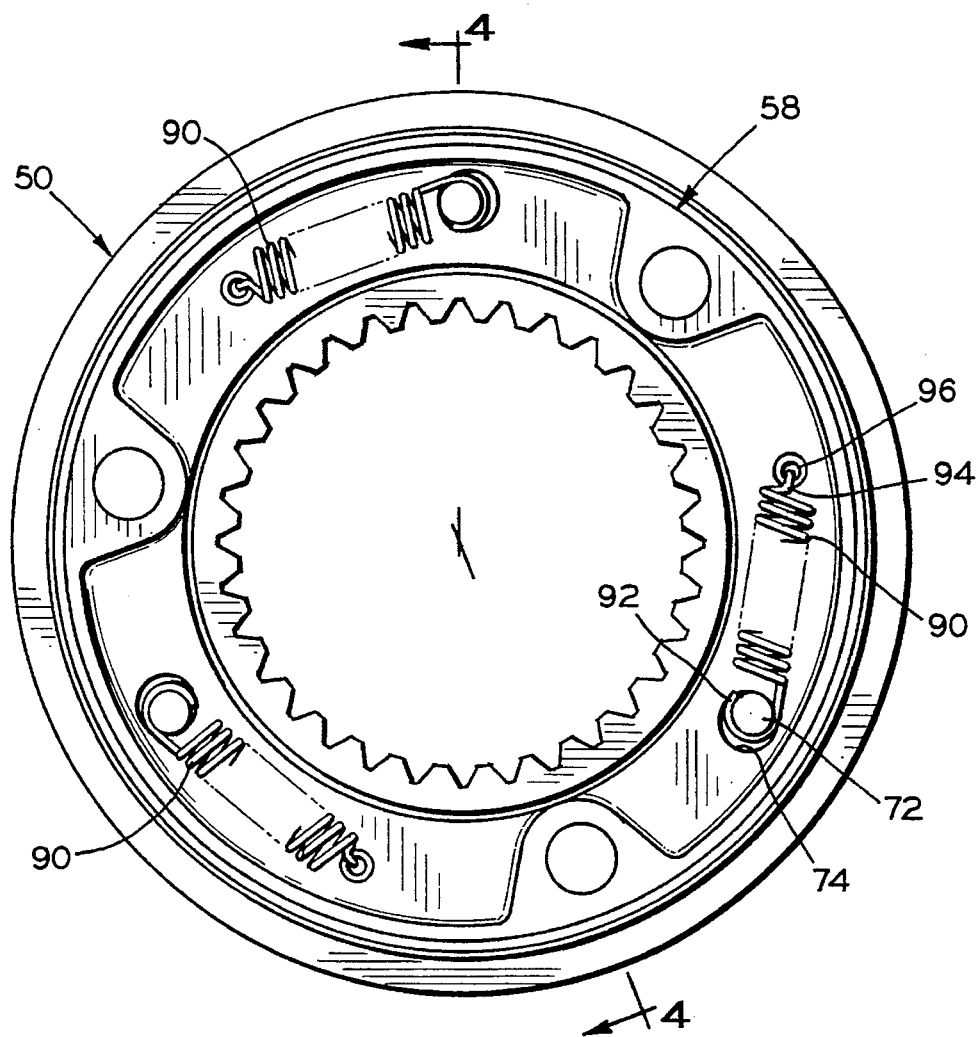
FIG. 3 is a view in elevation of the second friction race taken along lines 3—3 of FIG. 2.

As shown more clearly in FIG. 3, the first pins 68 are biased in one circumferential direction by springs 90. Although a helical extension spring is shown, it is to be understood that any suitable type of spring can be used as long as the distal end 72 of the first pin 68 is biased out of alignment with the first orifices 70 in the clutch collar. The springs are provided at one end with a curved end or pin hook 92 suitable for wrapping around the annular groove 76 in the distal end 72 of the first pin. Any other suitable means for attachment of the spring to the pin could be used. The springs are shown in the unattached mode in FIG. 2. The other end of the spring is provided with a race hook 94 which is adapted to hook into spring opening 96 in the second friction race 58. It is to be understood that any suitable means for attaching the end of the spring to the second friction race can be used. Although the springs are shown as being on the rearward side (to the left as viewed in FIG. 4) of the second friction race, it is is to be understood that the springs can be positioned on the forward side of the second friction race.

The action of the spring biases the first pins circumferentially within the second race openings 74 and the clutch collar first orifices 70 so that the first pins are not aligned within those orifices. Since there is no alignment, axial movement is prevented. In order to align the first pins within the clutch collar first orifices 70, the clutch collar must be slightly rotated with respect to the second friction race 58. This action moves the distal end 72 of the pins circumferentially away from the spring opening 96 and the race hook 94, thereby stretching the spring. Since the spring is normally under tension, a force is required to overcome the bias of the spring.

In operation, when moving the clutch collar forwardly, toward the first friction race 56, to engage the first ratio gear 32, the clutch collar must be slightly rotated to align the first pin within the first clutch collar orifice 70 to accommodate the chamfered shoulder 86. This slight rotation is resisted by the biasing force of the spring, which must be overcome, before the clutch collar can be moved to engage the gear. Likewise, when moving the clutch collar rearwardly, toward the second friction race 58, to engage the second ratio gear 34, the clutch collar must be slightly rotated to align the second pin 78 within the second clutch collar orifice 80 to accommodate the chamfered shoulder 88. This slight rotation is also resisted by the biasing force of the spring, which must be overcome, before the clutch collar can be moved to engage gear 34. Therefore, it can be seen that axial movement of the clutch collar in either the forward or the rearward direction requires circumferential movement or rotation of the clutch collar with respect to the second friction race, thereby requiring force to overcome the bias of the spring.

Although the invention has been shown in its preferred embodiment as having a set of three first blocker pins 68 and a set of three second blocker pins 78, it is to be understood that the invention can be operable with a single first pin and a single second pin. Also, the primary reason for the second set of blocker pins 78 is to provide a shoulder 88 to require alignment of the second pins for movement in the rearward direction. The invention, in its simplest form, could utilize only first pins, or a single first pin, as long as the pin is biased out of alignment with the clutch collar orifice 70.

Figure 5:
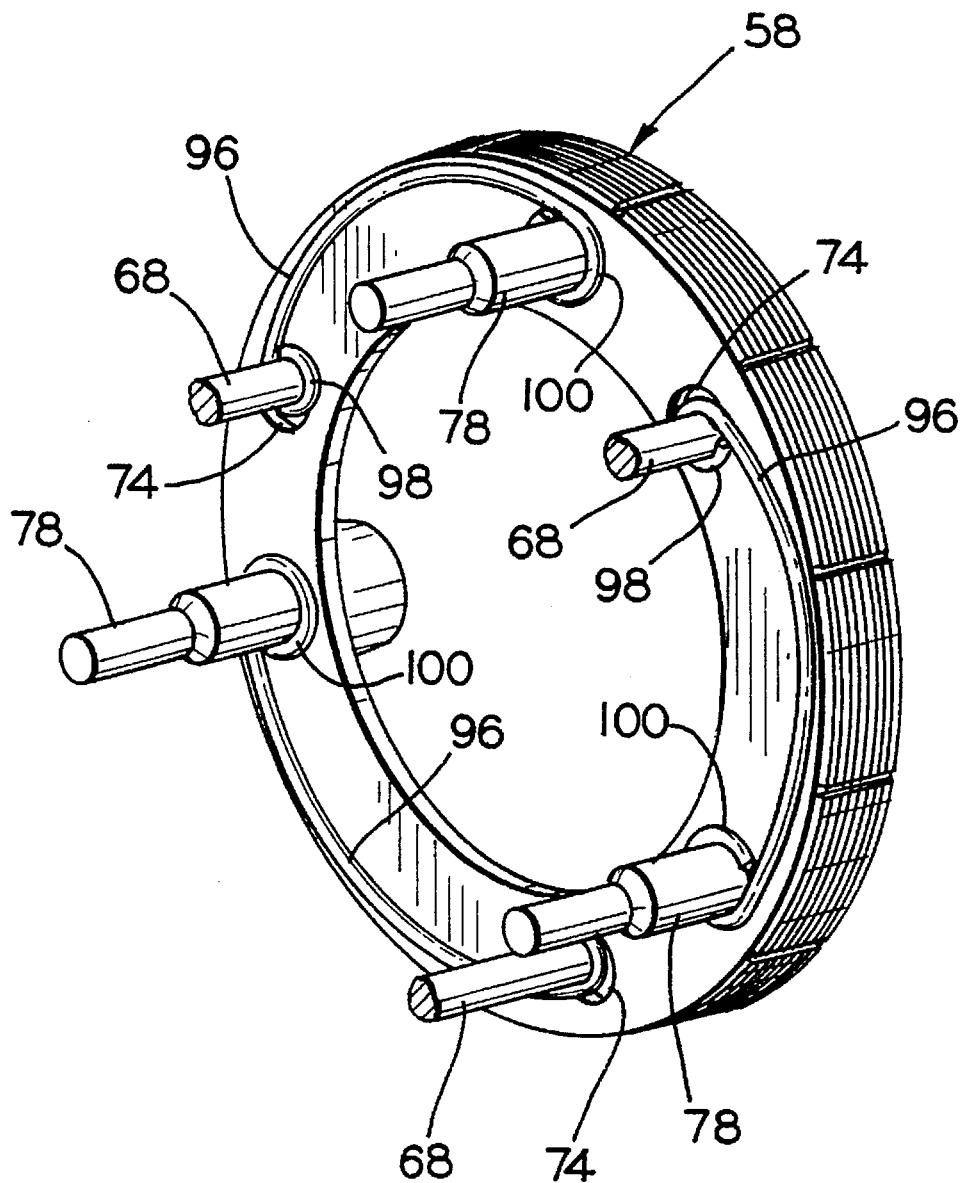
FIG. 5 is a schematic perspective view illustrating an alternate embodiment in which beam springs are used to bias the pins.

A variation of the invention is shown in FIG. 5 in which only the second friction race 58, the first pins 68, and the second pins 78 are shown. Instead of using a helical spring connected between the first pins and the second friction race itself (as shown in FIGS. 2–4), a spring, such as beam spring 96, provides a biasing force for the first pins 68 by connecting the first pins 68 with the second pins 78. The beam spring 96 has a first end 98 wrapped around the first pins 68 and a second end 100 wrapped around the second pins 78. The action of the beam spring is to bias the first pins 68 within the larger orifices 74 in the second friction race so that the pins are not normally centered within the orifices. The beam springs are forced into a stressed condition during assembly of the synchronizer, and as shown are normally under tension. Although the beam springs are shown as providing a force biasing the first and second pins toward each other, it is to be understood that the springs could be adapted to bias the first and second pins away from each other. The necessary condition is that the first pin is biased out of alignment with the clutch collar orifice 70. Thus in its broadest form, this embodiment provides for linking a first pin 68 with a second pin 78 with a biasing force which normally misaligns the first pin within the clutch collar orifice, where the biasing force must be overcome to align the pin to enable axial movement of the clutch collar. Once installed, the beam spring acts like a preloaded beam which to which more load is applied when the clutch collar is indexed with respect to the friction race.

It will be evident from the foregoing that various modifications can be made to this invention. Such, however are considered as being within the scope of the invention.

What is claimed is:

1. A transmission gear synchronizer apparatus comprising:

first and second friction races mounted for movement coaxially with each other in a spaced apart relationship, the friction races being mounted for coaxial movement into and out of engagement with friction surfaces;

an annular shiftable clutch collar positioned between the two friction races, the clutch collar being mounted for coaxial movement with respect to the friction races to enable engagement of the clutch collar with transmission gears, the clutch collar having at least one orifice through which a pin can be extended;

a first pin extending through the clutch collar orifice, and secured at one end to the first friction race, with the other, distal end of the first pin extending toward the second friction race, where alignment of the first pin within the clutch collar orifice is required to enable the clutch collar to move axially with respect to the friction races; and a spring biasing the first pin out of alignmment with the clutch collar orifice so that alignment of the first pin within the clutch collar orifice requires force to overcome the bias of the spring, where one end of the spring is connected to the distal end of the pin and the other end of the spring is connected to the second friction race.

2. The synchronizer apparatus of claim 1 in which the spring is normally under tension.

3. The synchronizer apparatus of claim 1 in which the distal end of the pin extends through an orifice in the second friction race.

4. The synchronizer apparatus of claim 3 in which the orifice in the second friction race is larger than the first pin to enable the pin to move circumferentially with respect to the second friction race.

5. The synchronizer apparatus of claim 1 in which the connection of the spring to the second friction race is through an opening in the second friction race.

6. The synchronizer apparatus of claim 1 in which the distal end of the first pin has an annular groove for securing the spring.

7. The synchronizer apparatus of claim 6 in which the spring has a curved end which is wrapped around the distal end of the first pin.

8. The synchronizer apparatus of claim 1 including a second pin extending through a second clutch collar orifice, and secured at one end to the second friction race, with the other, distal end of the second pin extending toward the first friction race, where alignment of the second pin within the second clutch collar orifice is required to enable the clutch collar to move axially with respect to the friction races, and where alignment of the second pin within the clutch collar orifice requires circumferential movement of the clutch collar with respect the second friction race, thereby requiring force to overcome the bias of the spring.

9. The synchronizer apparatus of claim 8 in which the spring is normally under tension, the distal end of the pin extends through an orifice in the second friction race, the orifice in the second friction race is larger than the first pin to enable the pin to move circumferentially with respect to the second friction race, and the connection of the spring to the second friction race is through an opening in the second friction race.

10. The synchronizer apparatus of claim 1, where the first pin has a reduced diameter portion defining a chamfered blocking shoulder engageable with the clutch collar orifice requiring alignment of the first pin within the clutch collar orifices to enable the clutch collar to move axially with respect to the friction races, and where the second pin has a reduced diameter portion defining a chamfered blocking shoulder engageable with the clutch collar orifice requiring alignment of the second pin within the clutch collar orifice to enable the clutch collar to move axially with respect to the friction races, and where the second pin is normally out of alignment with the clutch collar orifice.

11. A transmission gear synchronizer apparatus comprising:

first and second friction races mounted for movement coaxially with each other in a spaced apart relationship, the friction races being mounted for coaxial movement into and out of engagement with friction surfaces;

an annular shiftable clutch collar positioned between the two friction races, the clutch collar being mounted for coaxial movement with respect to the friction races to enable engagement of the clutch collar with transmission gears, the clutch collar having at least one orifice through which a pin can be extended;

a set of first pins extending through circumferentially spaced clutch collar orifices, and secured at one end to the first friction race, with the other, distal end of the first pins extending toward the second friction race, where alignment of the first pins within the clutch collar orifices is required to enable the clutch collar to move axially with respect to the friction races; and springs biasing the first pins out of alignment with the clutch collar orifices so that alignment of the first pins within the clutch collar orifices requires force to overcome the bias of the springs, where one end of the springs is connected to the distal end of the pins and the other end of the springs is connected to the second friction race.

12. The synchronizer apparatus of claim 11 in which the springs are normally under tension.

13. The synchronizer apparatus of claim 11 in which the connection of the springs to the second friction race is through openings in the second friction race.

14. The synchronizer apparatus of claim 11 in which the distal end of the first pins extends through orifices in the second friction race, and the orifices in the second friction race are larger than the first pins to enable the first pins to move circumferentially with respect to the second friction race.

15. The synchronizer apparatus of claim 14, where the first pins have a reduced diameter portion defining a chamfered blocking shoulder engageable with the clutch collar orifice requiring alignment of the first pins within the clutch collar orifices to enable the clutch collar to move axially with respect to the friction races, and further including a set of second pins extending through second clutch collar orifices, and secured at one end to the second friction race, with the other, distal end of the second pins extending toward the first friction race, where the second pins have a reduced diameter portion defining chamfered blocking shoulders engageable with the clutch collar orifices requiring alignment of the second pin within the clutch collar orifice to enable the clutch collar to move axially with respect to the friction races, where the second pins are normally out of alignment with the clutch collar orifices, where alignment of the second pins within the clutch collar orifice requires circumferential movement of the clutch collar with respect the second friction race, thereby requiring force to overcome the bias of the springs, and where the springs are normally under tension.

16. A transmission gear synchronizer apparatus comprising:

first and second friction races mounted for movement coaxially with each other in a spaced apart relationship, the friction races being mounted for coaxial movement into and out of engagement with friction surfaces;

an annular shiftable clutch collar positioned between the two friction races, the clutch collar being mounted for coaxial movement with respect to the friction races to enable engagement of the clutch collar with transmission gears, the clutch collar having at least one orifice through which a pin can be extended;

a first pin extending through the clutch collar orifice, and secured at one end to the first friction race, with the other, distal end of the first pin extending toward the second friction race, where alignment of the first pin within the clutch collar orifice is required to enable the clutch collar to move axially with respect to the friction races;

a second pin extending through a second clutch collar orifice, and secured at one end to the second friction race, with the other, distal end of the second pin extending toward the first friction race, where alignment of the second pin within the second clutch collar orifice is required to enable the clutch collar to move axially with respect to the friction races; and a spring biasing the first pin out of alignment with the clutch collar orifice so that alignment of the first pin within the clutch collar orifice requires force to overcome the bias of the spring, where one end of the spring is connected to the distal end of the first pin and the other end of the spring is connected to the second pin.

17. The synchronizer apparatus of claim 16 in which the spring is normally under tension.

18. The synchronizer apparatus of claim 13 in which the spring is a beam spring.

19. The synchronizer apparatus of claim 16 including:
- a set of first pins extending through the clutch collar orifice, and secured at one end to the first friction race, with the other, distal end of the first pins extending toward the second friction race, where the first pins have a reduced diameter portion defining a chamfered blocking shoulder engageable with the clutch collar orifice requiring alignment of the first pins within the clutch collar orifices to enable the clutch collar to move axially with respect to the friction races;
- a set of second pins extending through clutch collar orifices, and secured at one end to the second friction race, with the other, distal end of the second pins extending toward the first friction race, where the second pins have a reduced diameter portion defining chamfered blocking shoulders engageable with clutch collar orifices requiring alignment of the second pins within the clutch collar orifices to enable the clutch collar to move axially with respect to the friction races; and
- springs biasing the first pins out of alignment with the clutch collar orifices so that alignment of the first pins within the clutch collar orifices requires force to overcome the bias of the springs, where one end of the springs is connected to the distal end of the first pins and the other end of the springs is connected to the second pins.

20. The synchronizer apparatus of claim 19 where the spring is a beam spring, and where the second pins are normally out of alignment with the clutch collar orifices, where alignment of the second pins within the clutch collar orifices requires circumferential movement of the clutch collar with respect to the second friction race, thereby requiring force to overcome the bias of the springs, and where the distal ends of the pins extend through orifices in the second friction race, and in which the orifices in the second friction race are larger than the first pins to enable the first pins to move circumferentially with respect to the second friction race.

* * * * *